United States Patent [19] [11] 4,269,034
Rzechula [45] May 26, 1981

[54] ABSORPTION UNIT WITH VARIANT CONTROL SYSTEM

[76] Inventor: Joseph A. Rzechula, 459 E. Park Ave., Elmhurst, Ill. 60126

[21] Appl. No.: 73,851

[22] Filed: Sep. 10, 1979

[51] Int. Cl.³ ............................................. F25B 15/00
[52] U.S. Cl. ........................................ 62/141; 62/148; 62/476
[58] Field of Search .......................... 62/141, 148, 476

[56] References Cited
U.S. PATENT DOCUMENTS

| | | | |
|---|---|---|---|
| 2,948,124 | 8/1960 | Embury, Sr. | 62/141 X |
| 2,984,990 | 5/1961 | Leonard, Jr. | 62/141 |
| 3,122,002 | 2/1964 | Miner et al. | 62/148 |
| 3,254,499 | 6/1966 | Hopkins | 62/141 X |
| 3,301,000 | 1/1967 | Holbay | 62/141 |
| 3,410,104 | 11/1968 | Hopkins | 62/148 |
| 3,426,547 | 2/1969 | Foster | 62/101 |
| 3,452,552 | 7/1969 | Johnson | 62/141 |
| 3,590,593 | 7/1971 | Miner | 62/148 |
| 3,613,390 | 10/1971 | Bawel | 62/148 |
| 3,744,265 | 7/1973 | Bawel | 62/141 |
| 3,837,174 | 9/1974 | Miyagi et al. | 62/476 |
| 3,895,499 | 7/1975 | Hopkins | 62/141 |
| 4,090,372 | 5/1978 | Lamb | 62/141 |

Primary Examiner—Lloyd L. King
Attorney, Agent, or Firm—Neuman, Williams, Anderson & Olson

[57] ABSTRACT

An absorption refrigeration system responsive to variant load demands provides a conventional absorption unit and a control system which adjusts the operation of the unit according to the load demand. The absorption unit has an evaporator-absorber section where refrigerant is flash cooled in a near vacuum and absorbent solution absorbs the refrigerant vapor; a generator-condenser section where the solution diluted with refrigerant is heated vaporizing the refrigerant to be condensed and returned to the evaporator; a condenser fluid supply which supplies condenser fluid to the absorber and condenser for heat transfer and carries away heat dissipated therein; a heat source supply which heats the solution in the generator; and, a chilled fluid supply which supplies a chilled fluid to the evaporator for the flash cooling heat transfer and carries the cooled chilled fluid to fan coil units for refrigeration purposes. The control system has temperature sensitive probes which monitor the temperature of the chilled fluid entering and leaving the evaporator and provide signals accordingly; a differential temperature controller which receives the probe signals, compares the signals against each other and against predetermined design specifications for the absorption unit, and provides a resultant signal dependent upon the comparisons; and flow control valves which receive the resultant signal and regulate the flow of the condenser fluid, the chilled fluid, and the heating medium. Additional flow control valves responsive to the resultant signal for regulating the flow of solution to the generator and refrigerant to the evaporator are provided.

46 Claims, 3 Drawing Figures

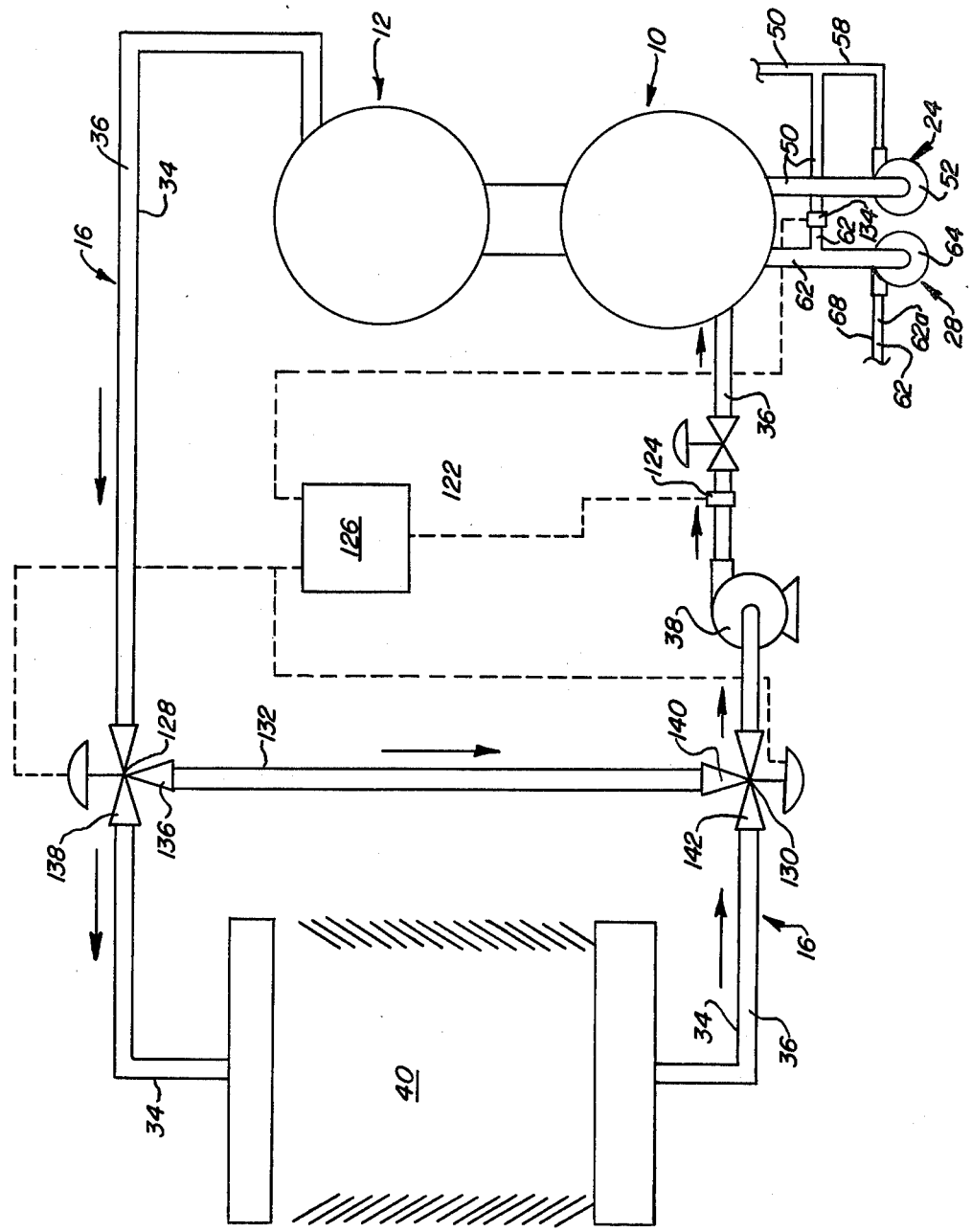

ABSORPTION UNIT WITH VARIANT CONTROL SYSTEM

FIELD OF THE INVENTION

This invention is directed to refrigeration systems of the absorption type and more particularly to controls for adjusting the operation of such systems to improve efficiency and to make such systems more responsive to variant load demands.

BACKGROUND OF THE INVENTION

In view of escalating fuel demands and diminishing fuel supplies in recent years, it has become increasingly important to conserve the fuel available by reducing consumption or by improving the efficiency of fuel consuming machines. Air conditioning or other cooling systems are devices in which large amounts of fuel can be conserved by relatively small improvements in efficiency or cutbacks in comsumption of each system.

There are many different types of refrigeration systems and some are more energy efficient than others. Therefore, the less efficient systems are gradually being abandoned or replaced at great expense to the system owner. For example, because of energy conservation concerns, absorption refrigeration systems which are typically used for large commercial or industrial air conditioning or other cooling purposes have not been well received in recent years due to the low overall operating efficiencies of such systems. Generally, such absorption units operate at optimum efficiency when the system experiences full load demand and the efficiency drastically decreases as the unit is subjected to partial load conditions. Thus, by modifying absorption units to increase the efficiency at partial load situations, energy producing fuels may be saved and absorption unit owners may avoid the tremendous expense involved in abandoning or replacing the unit.

Most of the refrigeration systems of the absorption type in use today utilize water as a refrigerant and a salt solution such as lithium bromide as the absorbent. These absorption units operate on two basic principles: (1) that water will boil and flash cool at low temperatures if subjected to high vacuum conditions, and, (2) that certain substances absorb water vapor.

The five main components of an absorption refrigeration system generally are the evaporator, the absorber, the solution heat exchanger, the generator, and the condenser. The absorption unit operates on a two pressure cycle; high vacuum condition in the evaporator-absorber section, and a different pressure in the generator-condenser section. A chilled fluid, usually water, is pumped within a closed loop conduit to the evaporator to be cooled indirectly by spray water acting as a refrigerant. In the high vacuum, the refrigerant flashes, thereby cooling the chilled fluid. The refrigerant vaporized in the evaporator is absorbed by a strong absorbent solution, normally lithium bromide, which is pumped through the solution heat exchanger to the generator to reconstitute the weak solution retained within the generator. Using steam or some other heat source, the absorbed refrigerant is boiled off the weak solution and is condensed to a liquid in the condenser section. The refrigerant vapor condensate is returned to the evaporator, while the weak solution, now strong again, flows from the generator to the absorber as an overflow or via the solution heat exchanger arriving as a spray.

Condenser fluid, again usually water, circulates in a closed loop conduit from a cooling tower, through a condenser fluid pump, through the absorber and condenser, and returns to the cooling tower. The circulating condenser fluid removes the heat dissipated in the absorber and condenser.

The chilled fluid, also in a closed loop conduit, circulates from a chilled fluid pump, through the evaporator, to fan units for cooling the air, and returns to the chilled fluid pump.

Capacity controls of one type or another are used to control the absorption unit for partial load conditions. Ordinarily, such control is arranged in one of three ways: (1) throttling the amount of heat supplied to the generator to vary solution concentration, (2) throttling the solution flow from the solution heat exchanger to the generator, thereby changing the solution concentration in the absorber, and (3) throttling the condenser fluid flow to maintain a solution concentration needed to produce refrigeration capacity at the design chilled fluid temperature.

Throttling of the heat source, though not the most economical arrangement, is the most accepted method of control of absorption units. The other two capacity controls also have disadvantages. The cost of the special three-way diverting valve usually used to throttle solution flow is expensive, and the high fluid temperatures resulting at light loads from throttling the condenser fluid accelerates the deposit build-up within the condenser conduit.

Various capacity controls using combinations of the above-mentioned control arrangements and modifications thereof are known. Some control systems for absorption units provide higher operation efficiency, but usually at high initial or operating expense, while other control systems sacrifice efficiency for reduced installation costs.

One system, which controls the temperature in the evaporator, the absorbent solution concentration, and heat input to the generator, utilizes a steam valve responsive to a controller receiving signals from temperature probes in the chilled water entering and leaving the evaporator and in the condenser water leaving the condenser. This system also has a condenser water override valve responsive to the temperature of the condenser water entering the absorber. Although this system does eliminate cycling of the absorption unit by regulating the steam valve, the system is disadvantaged because several expensive electrical controllers and temperature probes are required and the system is not readily conducive to environmental use.

Another control system uses proportional controllers to produce both hot and cold water from an absorption system with a direct-fired high pressure generator. With this system, a pair of controllers which respond to temperatures of the chilled water entering and leaving the evaporator control a fuel control valve, a refrigerant valve and a dilute solution valve. The system is not particularly designed to experience variant load demands, but rather, is designed to use a waste heat source to advantage. The system, also has a high heat rejection to the cooling tower, thereby requiring a larger, more expensive cooling tower.

Still another control system has dual capacity control means to achieve better economy at partial load operation by automatically shutting down one of two absorption refrigeration machines. This system nearly doubles the initial installation and equipment costs involved because two machines are used, yet, no internal change to the general absorption machinery is utilized. Thus, both machines run as usual with no adjustment in operation responsive to partial load demand until the demand is sufficiently low that one machine is shut down. The efficiency of each individual machine is not improved.

In another type of control system, the absorption refrigeration unit has a steam valve responsive to the temperature of the chilled water exiting the evaporator, a condenser water by-pass valve for diverting condenser water from the condenser to the cooling tower, and a three-way valve responsive to the temperature of the condenser water entering the absorber for diverting condenser water from the cooling tower. This system also has multiple electrical contactors for pump start-stop operation which cause high peak demand charges and may cause increased pump maintenance. The control features of this system are expensive and do not significantly improve the efficiency of the absorption unit at variant load demands nor do they improve the reduction of scaling or heat transfer characteristics.

The absorber variant control system of the present invention eliminates many of the problems presented by the above control systems for absorption units. It is an object of this invention to provide more efficient operation of an absorption unit at variant load demands.

Another object of the present invention is to provide effective steam, hot water, or alternate fuel source flow control in proportion to machine load demand.

Still another object of the present invention is to reduce the cooling tower make-up water usage due to reduction of heat load at the condenser, thereby reducing chemical water treatment operating costs.

A further object of the present invention is to provide optimum flow velocities through the evaporator, absorber, and condenser dependent upon cooling load demands and thereby decrease corrosion rates on heat exchanger surfaces, i.e., the absorber, condenser, evaporator and generator, due to a decrease in average operating flow velocities.

Also, an object of the present invention is to provide a proportionate signal to the flow control valves by sensing both the chilled water supply and return temperatures and having a differential temperature controller determine the percent of cooling load demand.

Still another object of the present invention is to reduce both the temperature and concentration of the lithium bromide solution in the generator during low and variant loads by more efficient steam, hot water, or other heat source control.

An additional object of the present invention is to reduce cycling of the machine when the load changes or varies by measuring and comparing the chilled water temperature as it enters and leaves the evaporator and controlling the machine accordingly.

Another object of the present invention is to provide a chilled water flow control valve having a minimum aperture during closing whereby a partial flow is allowed for continuous monitoring for temperature or load changes.

Other objects and advantages of the invention will become apparent upon reading the following summary of the invention, detailed description and appended claims, and upon reference to the accompanying drawings.

SUMMARY OF THE INVENTION

The absorption refrigeration system with variant control of this invention comprises an evaporator-absorber arrangement, a solution heat exchanger, a generator-condenser arrangement, a condenser fluid supply, a chilled fluid supply, a heat source supply, and a control arrangement. The evaporator-absorber arrangement is kept at a high vacuum and comprises an evaporator section and an absorber section in communication with each other. The generator-condenser arrangement is kept at a pressure different from that of the evaporator-absorber arrangement and comprises a generator section which communicates with a condenser section. Passing through the evaporator section is a portion of a conduit for the chilled fluid supply, said conduit carries a flow of chilled fluid. Refrigerant, usually water, is circulated through the evaporator section and delivered in the proximity of the chilled fluid supply conduit within the evaporator section where it flashes to vapor as heat transfers from the chilled fluid to the refrigerant. The refrigerant vaporized in the evaporator section is absorbed by an absorbent solution, usually lithium bromide, which circulates through the absorber section. The heat given off by the absorption transfers to the condenser fluid within a portion of a conduit for the condenser fluid supply which passes through the absorber section.

The solution diluted by absorbing refrigerant vapor is pumped through the solution heat exchanger to the generator section of the generator-condenser arrangement where it is heated to a boil by heat from the heat source supply. As the dilute solution boils, refrigerant is vaporized and separates from the solution, thereby making the residuum solution more concentrated. This concentrated solution then travels back to the absorber section either by a direct overflow or via the solution heat exchanger to reconstitute the dilute solution upon absorbing more refrigerant vapor.

The refrigerant vaporized in the generator section is condensed in the condenser section, and the heat emitted during condensation transfers to the condenser fluid in a second portion of the conduit for the condenser fluid supply which passes through the condenser section. The refrigerant vapor condensate settles in a reservoir or trough within the condenser section and then travels back to the evaporator section via a tube connecting both sections.

The chilled fluid supply comprises a closed loop conduit, a chilled fluid pump, and refrigeration fan coil units. The chilled fluid conduit transports the circulating chilled fluid from the chilled fluid pump, through the evaporator section where it is flash cooleld, to the fan coil units and back to the chilled fluid pump.

The condenser fluid supply comprises a closed loop conduit, a condenser fluid pump, and a cooling tower. The condenser fluid conduit transports the circulating condenser fluid, usually water, from the condenser fluid pump to and through the absorber section where the fluid gains heat, to and through the condenser section where the fluid gains additional heat, to the cooling tower for cooling, and back to the condenser fluid pump.

The heat source supply utilizes any of a number of heating mediums, such as steam, hot water, or waste heat, and comprises a conduit which transports the heating medium to and from the generator section. In the generator section, heat from the heating medium causes the dilute solution to boil, as mentioned above.

One embodiment of the control arrangement utilized to modify the operation of the absorption refrigeration unit in accordance with variant load demands comprises a plurality of temperature sensing probes, a differential temperature controller, and a plurality of flow control valves. One temperature sensing probe monitors the temperature of the chilled fluid entering the evaporator section while a second temperature probe monitors the temperature of the chilled fluid leaving the evaporator section. Each such probe provides a signal to the differential temperature controller and each signal has a magnitude dependent upon the temperature of the chilled fluid. The differential temperature controller compares the signals received against each other and against design specifications for the particular absorption unit and provides a resultant signal having a magnitude dependent upon the instantaneous comparison relationship of the signals and the specifications. The resultant signal is received by the flow control valves and each valve responds according to the magnitude of the resultant signal.

A heat source flow control valve located on the heat source supply conduit entering the generator opens and modulates or closes down proportionately in response to the resultant signal which is a function of the actual load on the absorption unit as detected by the temperature sensing probes. Also, a chilled fluid flow control valve located on the chilled fluid supply conduit entering the evaporator proportionately opens or closes in response to the resultant signal, thereby regulating the flow of the chilled fluid. Likewise, a condenser fluid flow control valve located on the condenser fluid supply conduit entering the absorber proportionately opens or closes in response to the resultant signal to regulate the flow of condenser fluid.

Thus, the respective flows of condenser and chilled fluid and of heat from the heat source are determined and controlled by the instantaneous load demand on the absorption unit as detected by the temperature sensing probes.

A more detailed description of this and other preferred embodiments is set forth with more particularity herein below.

BRIEF DESCRIPTION OF THE DRAWINGS

For a more complete understanding of this invention, reference should now be directed to the embodiments illustrated in greater detail in the accompanying drawings and described below. In the drawings.

DETAILED DESCRIPTION OF THE PREFERRED EMBODIMENTS

Figure 1:
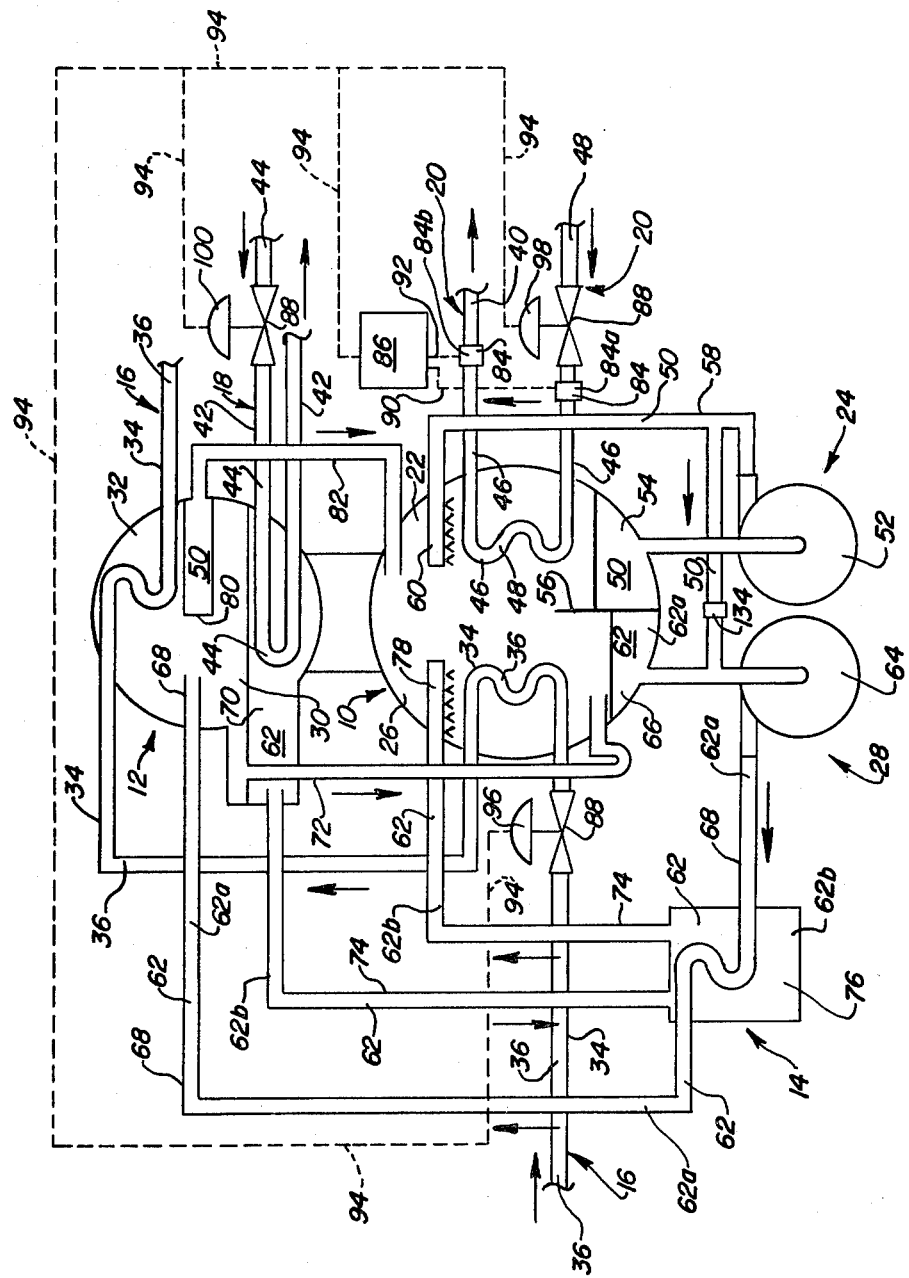
FIG. 1 is a schematic of the absorption unit with a variant control system showing generally the relative positions of the component parts of the absorption unit and the control system of this invention.

Referring generally to the drawings, like components will bear like reference numerals and arrows will indicate the direction of flow of the various fluid mediums.

Turning first to FIG. 1, the absorption refrigeration unit of this invention has a variant control system and comprises an evaporator-absorber arrangement 10, a generator-condenser arrangement 12, a solution heat exchanger 14, a condenser fluid supply 16, a heat source supply 18, and a chilled fluid supply 20. The evaporator-absorber arrangement 10 comprises an evaporator section 22, a refrigerant circulation assembly 24, an absorber section 26, and a solution circulation assembly 28. The generator-condenser arrangement 12 comprises a generator section 30 and a condenser section 32. The condenser fluid supply 16 comprises a closed loop conduit 34 for transporting condenser fluid 36, a condenser fluid pump 38, shown only in FIG. 3, and a cooling tower 40, also, shown only in FIG. 3. The condenser fluid 36 in the closed loop conduit 34 of the condenser fluid supply 16 is pumped through the absorber section 26 of the evaporator-absorber arrangement 10, to and through the condenser section 32 of the generator-condenser arrangement 12, to the cooling tower 40 for cooling, and back to the condenser fluid pump 38 where the course is repeated. The heat source supply 18 comprises a conduit 42 for transporting a heating medium 44 such as steam or hot water, into and out of the generator section 30 of the generator-condenser arrangement 12 and back to a heat source, not shown. The heat source may be a steam or hot water producing generator or a supply of waste heat. The chilled fluid supply 20 comprises a closed loop conduit 46 for transporting chilled fluid 48, a chilled fluid pump, not shown, and refrigeration fan units, also not shown. The chilled fluid 48 in the closed loop conduit 46 is pumped through the evaporator section 22 of the evaporator-absorber arrangement 10, to the refrigeration fan units for cooling the air and back to the chilled fluid pump where the course is repeated.

In operation, an absorption refrigeration unit operates on two principles, as mentioned above, (1) that in a high vacuum water and certain other fluids will flash to vapor at low temperatures, and (2) certain solutions will absorb the vapor. The refrigerant circulation assembly 24, comprising a refrigerant pump 52, a refrigerant reservoir 54, a discharge pipe 58, and a refrigerant spray header 60, circulates refrigerant 50. The refrigerant 50 rests in the refrigerant reservoir 54 defined by the wall of the evaporator section 22 and a separator 56 before being drawn into the suction side of the refrigerant pump 52. The refrigerant 50, usually water, is pumped by the refrigerant pump 52 through the evaporator section 22 of the evaporator-absorber arrangement 10 through the discharge pipe 58 to the refrigerant spray header 60. The refrigerant 50 is then sprayed in the proximity of the conduit 46 carrying chilled fluid 48. The chilled fluid 48 enters the evaporator section 22 at a temperature sufficient to cause the spray of refrigerant 50 to flash to vapor. Thus, heat from the chilled fluid 48 transfers to the refrigerant 50, thereby cooling the chilled fluid 48 and vaporizing the refrigerant 50. The spray of refrigerant 50 that does not vaporize settles in the refrigerant reservoir 54, and the refrigerant 50 travel cycle is repeated. Meanwhile, the cooled chilled fluid 48 circulates to the refrigeration fan units for cooling the air or for other refrigeration uses and the refrigerant 50 vapor is drawn over the separator 56 into the absorber section 26 which communicates directly with the evaporator section 22.

The solution circulation assembly, comprising a solution pump 64, a solution reservoir 66, a discharge tube 68, a generator reservoir 70, an overflow tube 72, a solution pipe assembly 74, and a solution spray header 78, circulates absorbent solution 62, usually a lithium bromide solution, through both the absorber section 26 of the evaporator-absorber arrangement 10 and the generator section 30 of the generator-condenser arrangement 12. The solution 62 rests in the solution reservoir 66 defined by the wall of the absorber section 26 and the separator 56 before being drawn into the suction side of the solution pump 64. The solution pump 64 discharges the solution 62 through the discharge tube 68 to and through the solution heat exchanger 14 and to the generator section 30 of the generator-condenser arrangement 12. In the generator section 30, the solution 62 rests in the generator reservoir 70. As additional solution 62 is received in the generator section 30, solution 62 in the generator reservoir 70 returns to the absorber section 26 either by the overflow tube 72 or by the solution pipe assembly 74 which transports the solution 62 to a solution heat exchanger reservoir 76 within the solution heat exchanger 14 and then to the solution spray header 78.

The solution 62 is sprayed in the proximity of the condenser fluid supply conduit 34 carrying condenser fluid 36. The solution 62, having absorbent characteristics, draws vaporized refrigerant 50 from the evaporator section 22 over the separator 56 as the spray of solution 62 absorbs the refrigerant 50 vapor. Heat dissipated in the absorption process transfers to the condenser fluid 36 and is carried from the abosrber section 26. The solution 62, now weak or dilute solution 62a, rests in the solution sump or reservoir 66 before being pumped through the solution heat exchanger 14 to the generator section 30.

The solution 62 resting in the generator reservoir 70 is heated to a boil by the heat source supply 18 to effect evaporation of the refrigerant 50 from the diluent solution 62a. The heating medium 44 in the heat source conduit 42 transfers heat to the solution 62. As the temperature of the solution 62 increases refrigerant 50 within the dilute solution 62a vaporizes, leaving a residuum of concentrated solution 62b. To prevent the absorber section 26 from running dry of solution 62, the overflow tube 72 is provided which conveys solution 62 to the absorber section 26 in the event that the solution 62 reaches or exceeds a certain level in the generator reservoir 70. Otherwise, the concentrated solution 62b travels back to the absorber section 26 via the solution heat exchanger reservoir 76 where the concentrated solution 62b transfers heat acquired by the heating in the generator section 30 to the dilute solution 62a, thereby preheating the dilute solution 62a.

Since the condenser section 32 communicates directly with the generator section 30, the refrigerant 50 vaporized in the generator section 30 condenses in the condenser section 32 of the generator-condenser arrangement 12 and settles in a refrigerant condensate trough 80 separated from the generator reservoir 70. Heat dissipated in the condensation transfer to the condenser fluid 36 as it passes through the condenser section 32 and is removed from the condenser fluid 36 in the cooling tower 40. The refrigerant 50 condensate returns to reconstitute the refrigerant 50 in the evaporator section 22 via a return tube 82.

A preferred embodiment of the present invention comprises the conventional absorption refrigeration unit described above and a control system for controlling the operation of the unit at variant load demands. The control system may be added to an existing absorption unit or incorporated into a new unit and comprises a plurality of temperature sensitive probes 84, a differential temperature controller 86, and a plurality of flow control valves 88.

One temperature sensitive probe 84a is located on the chilled fluid supply conduit 46 immediately before the conduit 46 enters the evaporator section 22 of the evaporator-absorber arrangement 10, and it senses the temperature of the chilled fluid 48 entering the evaporator section 22. This probe 84a provides a signal, having a magnitude which is dependent upon the sensed temperature, to the differential temperature controller 86 via line 90. Another temperature sensitive probe 84b is located on the chilled fluid supply conduit 46 immediately after the conduit 46 leaves the evaporator section 22 of the evaporator-absorber arrangement 10. This probe 84b sense the temperature of the chilled fluid 48 leaving the evaporator section 22 and provides a signal, having a magnitude dependent upon the sensed temperature, to the differential temperature controller 86 via line 92. The signals provided by probes 84a and 84b may be electrical, pneumatic or of some other appropriate form. The temperatures sensed by the probes 84a and 84b are important to the accurate and efficient control of the absorption refrigeration unit at variant load demands because these temperatures and their differential represent not only a function of the load demand on the unit, but also, a function of the responsiveness of the unit to the demand.

The differential temperature controller 86 receives the signals from the probes 84a and 84b, compares the signals with each other, and compares the signals and their differential to a predetermined set of design specification values. These design specification values which define the parameters within which are absorption unit will operate efficiently, vary from unit to unit according to the unit, the purpose for which the unit is being used, and a number of other factors. Upon comparing the signals and design values, the differential temperature controller 86 provides a resultant signal which represents a function of the load demand on the unit and the operational adjustments required to adhere to design specifications. The resultant signal also may be electrical, pneumatic, or of some other appropriate form. The magnitude of the resultant signal is dependent upon the instantaneous relationship of the signals received from the probes 84a and 84b and the design specification values. The resultant signal is received by the plurality of flow control values 88 via line 94.

One flow control valve 88, the condenser fluid valve 96, is located on the condenser fluid supply conduit 34 immediately before the conduit 34 enters the absorber section 26 of the evaporator-absorber arrangement 10. The condenser fluid valve 96 regulates the flow, and therefore, the flow velocity of condenser fluid 36 into the absorber section 26 by opening or closing proportionately in response to the resultant signal received from the differential temperature controller 86. The volume of condenser fluid 36 flow decreases correspondingly in response to a decrease in the load demand. Thus, optimum flow velocity of the condenser fluid 36 through the absorber section 26 and the condenser section 32 dependent upon cooling load demands is achieved.

Another flow control valve 88, the chilled fluid valve 98, is located on the chilled fluid supply conduit 46 before the conduit 46 enters the evaporator section 22 of the evaporator-absorber arrangement 10 and immediately before the chilled fluid 48 reaches the temperature sensitive probe 84a. The chilled fluid valve 98 regulates the flow, and therefore, the flow velocity of chilled fluid 48 into the evaporator section 22 by opening and closing proportionately in response to the resultant signal received from the differential temperature controller 86. It is preferred that the chilled fluid valve 98 be limited to a minimum aperture during closing in order to allow partial flow of chilled fluid 48; thereby, a continuous flow is provided for temperature monitoring and for determination of load demand changes. However, it is to be understood that a valve not so limited may also be used, but the probe 84a would require relocation.

The chilled fluid valve 98 controls the flow of the chilled fluid 48 based upon the actual machine load. By controlling and regulating the chilled fluid 48 flow on the absorption unit, the differential temperature drop of entering to leaving chilled fluid 48 tends to maximize; thereby, increasing the unit operating efficiency. In other words, the temperature of the chilled fluid 48 leaving the evaporator section 22 is only cool enough to meet the load demand so that the entering chilled fluid 48 enters the evaporator section 22 at a design specified higher temperature. The flash cooling heat exchange process in the evaporator section 22 is much more efficient if the differential temperature drop meets design specifications.

Still another flow control valve 88, the heat source valve 100, is located on the heat source conduit 42 before the conduit 42 enters the generator section 30 of the generator-condenser arrangement 12. The heat source valve 100 regulates the flow and the flow velocity of the heating medium 44 into the generator section 30 by opening and closing proportionately in response to the resultant signal received from the differential temperature controller 86. It is preferred that the heat source valve 100 modulates after opening in order to prevent premature heating or overheating of the solution 62 in the generator section 30. This is because there is a slight lag in the responsiveness of absorption unit operations to more abrupt variations in load demand, particularly with respect to flow control of the chilled fluid 48 and the condenser fluid 36. This modulating characteristic is preferably integral with the heat source valve 100, however, the modulation producing mechanism may be external of the heat source valve 100. One way in which the modulating characteristic may be provided is to use in series on line 94 between the differential temperature controller 86 and the heat source valve 100 a modulator, an A.C. amplifier, and a demodulator (none of which are shown in the FIGURES). This modulation arrangement provides a modulating signal to the heat source valve 100 and makes it necessary that the resultant signal be an electrical signal or that there be a transducer between the modulator and the differential temperature controller 86 to provide an electrical resultant signal. A modulating signal may be provided in another way by utilizing totally pneumatic controls equivalent to the electrical controls described above.

It is also preferred that the heat source valve 100 be set to respond by opening before the condenser fluid or chilled fluid valves 96 and 98, in order to preheat the solution 62 in the generator section 30, and to respond by closing before the condenser fluid or chilled fluid valves 96 and 98, in order to prevent overheating of the solution 62.

By controlling the flow rate of the heating medium 44 into the generator section 30, little heat is wasted. This eliminates excessively high temperatures in the generator section 30 and reduces the heat load at the condenser section 32. During low and variant load demands on the absorption unit, the more efficient flow control of the heating medium 44, whether it be steam, hot water, waste heat, or whatever, accomplished by utilizing the control system of this invention reduces the temperature and the concentration of solution 62 in the generator section 30.

When using steam as the heating medium 44, the optimum flow control and regulation of steam to the absorption unit provides less variant steam load demands on the boiler and permits the boiler burner to operate with higher combustion efficiency.

In operation, the control system of the present invention detects the load demand placed upon the absorption unit and responds by signaling the flow control valves 88 accordingly. The flow control valves 88 then open or close proportionately thereby adjusting the operation of the absorption unit.

The control system operates in a manner best illustrated by addressing each situation the system might encounter. For example, a hypothetical absorption unit may operate at optimum efficiency when the temperature differential of entering to leaving chilled fluid 48 is 12° F., the leaving chilled fluid 48 is at 40° F., the entering condenser fluid 36 is below 90° F., and the exiting condenser fluid 36 is below 107° F. It is to be understood that these temperatures are merely examples and not intended to limit the scope of the present invention in any manner; the design specifications of every absorption unit vary according to the size, use, and purpose of the unit.

Upon determining the existing temperatures and the temperature differential, the differential temperature controller 86 provides a resultant signal that actuates the flow control valves 88 in a manner substantially described below.

Case 1

When the chilled fluid 48 differential temperature is less than 12° F. and the chilled fluid 48 is exiting the evaporator section 22 at greater than 40° F. and the demand on the absorption unit is up from a lesser load demand, the condenser fluid and chilled fluid valves 96 and 98 open proportionate to the temperature differential and the heat source valve 100 opens proportionately and modulates. This increases the heating in the generator section 30, thereby increasing the concentration of the solution 62, which in turn increases the absorption capacity of the solution 62 as it circulates into the absorber section 26. The greater flow of condenser fluid 36 and chilled fluid 48 accommodates the stepped-up heat transfer occurring at various points within the absorption unit which is caused by the increased absorption by the solution 62. This procedure in turn causes the temperature of the chilled fluid 48 to approach the design specification of 40° F.

Case 2

When the chilled fluid 48 differential temperature is greater than 12° F., the chilled fluid 48 is exiting the evaporator section 22 at greater than 40° F., and the demand on the absorption unit is again up from a lesser load demand, the unit has reached one hundred percent capacity and is exceeding design specifications. In this situation, each of the flow control valves 88 opens fully and the heat source valve 100 modulates with load changes. This opens the absorption unit to full operation in operation in order to cause the exiting temperature of the chilled fluid 48 to approach 40° F.

Case 3

When the chilled fluid 48 differential temperature is greater than 12° F., the chilled fluid 48 is exiting at 40° F. but entering at greater than 52° F., and the demand on the absorption unit, like in Case 2, is up from a lesser load demand, the unit has reached one hundred percent capacity. This case could occur subsequent to Case 2. in this situation, each of the flow control valves 88 open fully and the heat source valve 100 modulates with load changes. The absorption unit is opened to full operation in order to cause the entering temperature of the chilled fluid 48 to approach specification.

Case 4

When the chilled fluid 48 differential temperature is less than 12° F., the chilled fluid 48 is entering and exiting at greater than specification, and the demand on the absorption unit is up from a lesser demand but is approaching a load demand less than one hundred percent capacity, the condenser fluid and chilled fluid valves open proportionate to the temperature differential and the heat source valve proportionately opens and modulates. This increases the operation of the unit without opening it to full operation.

Case 5

When the chilled fluid 48 differential temperature is less than 12° F. but greater than 0° F., the chilled fluid 48 is exiting at 40° F., and the absorption unit is experiencing a low load demand or a demand down from a higher load demand, the condenser fluid valve 96 closes proportionate to the differential temperature, the chilled fluid valve 98 closes proportionate to the differential temperature but remains open greater than the minimum closure limit-stop, and the heat source valve closes proportionate to the temperature differential and modulates. This procedure reduces the concentration of the solution 62; and therefore, the absorption capacity of the solution 62 is reduced. Since a lesser flow of chilled fluid 48 to the refrigeration fan units is needed to meet the low demand, less flow is provided. Thus, the temperature of the flow of chilled fluid 48 should gradually increase thereby increasing the differential temperature.

Case 6

When the chilled fluid 48 differential temperature is 0° F. and the chilled fluid 48 is exiting at 40° F., the absorption unit is experiencing no load demand. When this occurs, the condenser fluid and heat source valves 96 and 100 close fully and the chilled fluid valve 98 closes to the minimum closure limite-stop. This procedure preserves energy and maintains a minimal flow of chilled fluid 48 for monitoring future load demand changes.

The control system of this invention, comprising the temperature sensitive probes 84, a differential temperature controller 86, and the flow control valves 88 as described above, cause a decrease in corrosion rates on heat exchanging surfaces, i.e., the evaporator, absorber, generator and condenser sections 22, 26, 30, and 32 due to a decrease in average operating flow velocities. The usage of cooling tower 40 make-up fluid is reduced due to an overall reduced heat load at the condenser section 32. This reduces operating costs due to the reduced need for chemical treatments corresponding to the reduction in cooling tower 40 make-up fluid usage. Also, potentially, the size of the condenser section 32 may be reduced because of the optimized use of the heat load.

Further, the control system accomplishes better scale deposit control on the heat transfer surfaces in the condenser section 32. Such scale deposits are normally caused by high leaving condenser fluid 36 temperatures which occur less frequently with the present invention.

Valuable energy is saved because the control system of the present invention maintains the pump motor requirements efficiently and effectively with respect to cooling demand of the absorption unit by controlling and regulating the pumped flows of condenser fluid 36, chilled fluid 48, and hot water, if such is used as the heating medium 44. This produces a reduction in electrical energy demand during partial cooling loads.

The control and regulation of the flow control valves 88 on an absorption unit maintains the solution 62 concentration at a level high enough to provide the required refrigeration capacity according to the specified chilled fluid 48 temperature. Thus, at a partial load demand, a less concentrated solution 62 provides sufficient absorption to accomplish the degree of refrigeration required.

Overall, the present invention reduces electrical, fuel, and mechanical energy operating costs by providing more economical operation of the absorption unit at partial load demand. The control system also reduces cycling of the absorption unit machinery when the load changes or varies as well as controlling the unit so that the chilled fluid 48 leaves the evaporator section 22 at a reasonably constant temperature.

Figure 2:
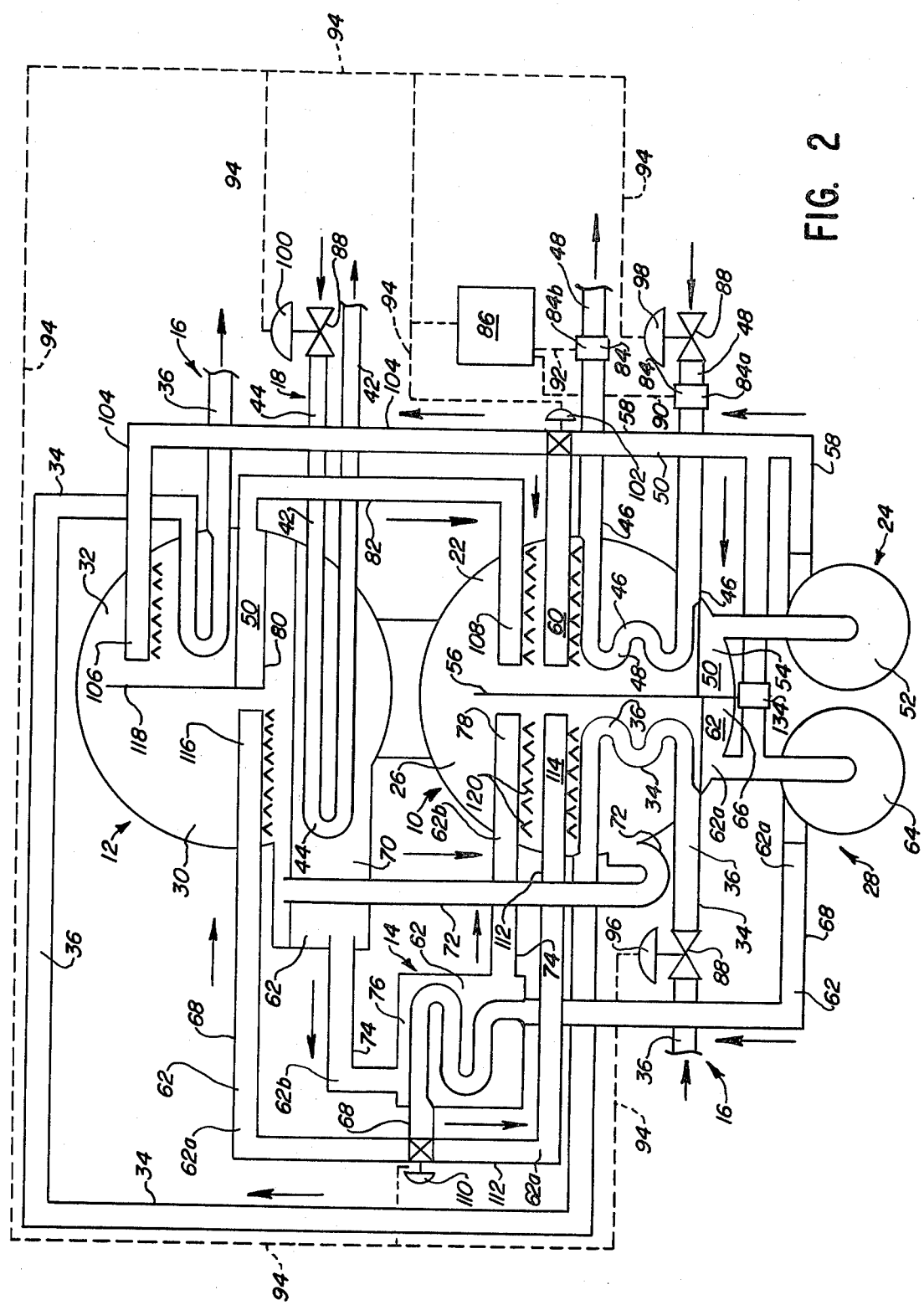
FIG. 2 is a schematic of another embodiment of an absorption unit with a variant control system showing a piping arrangement modified from that shown in FIG. 1; and, FIG. 3 is a schematic of the condenser fluid supply showing a control arrangement for regulating the flow of condenser fluid to the cooling tower and bypassing the cooling tower.

Another preferred embodiment of the present invention appears in FIG. 2 and comprises an absorption unit with modified solution 62 and refrigerant 50 piping arrangements and a control system similar to that described above.

The refrigerant circulation assembly 24 of this embodiment further comprises a three-way refrigerant valve 102, a refrigerant conduit 104, and a condenser spray header 106. Also, the refrigerant return tube 82 has a spray header 108. The solution circulation assembly 28 further comprises a three-way solution valve 110, a solution diverting conduit 112, and an absorber spray header 114. The solution discharge tube 68 also has a generator spray header 116.

Each of the three-way valves, the refrigerant valve 102 and the solution valve 110, receive the resultant signal provided by the differential temperature controller 86 via line 94, and is responsive thereto.

The refrigerant valve 102 directs refrigerant 50 discharged from the refrigerant pump 52 to either the refrigerant spray header 60 or the condenser spray header 106, or both. It is preferred that the refrigerant valve 102 proportionately distributes the refrigerant 50 to the refrigerant and condenser spray headers 60 and 106 in accordance with the magnitude of the resultant signal. If the resultant signal provided represents that the absorption unit is experiencing no load demand, the entire flow of refrigerant 50 is directed through the refrigerant diverting conduit 104 to the condenser spray header 106. If the resultant signal provided represents that the absorption unit is experiencing full load demand, the entire flow of refrigerant 50 is directed to the refrigerant spray header 60.

The refrigerant return tube 82 conveys the mixture of refrigerant 50 condensed in the condenser section 32 and refrigerant 50 diverted by refrigerant valve 102 to the condenser section 32 back to the evaporator section 22. The application of spray header 108 on return tube 82 improves heat transfer efficiency within the evaporator section 22. Spray header 108 discharges the refrigerant 50 into the heat exchange area as a thin spray so that it particuipates in the flash cooling process rather than merely dumping the refrigerant 50 into the sump or refrigerant reservoir 54 of the evaporator section 22. Since the refrigerant 50 entering the evaporator section 22 from the condenser section 32 typically has a higher temperature than the refrigerant 50 sprayed through refrigerant spray header 60, the temperature differential between the entering refrigerant 50 and the chilled fluid 48 entering the evaporator section 22 is increased which makes the refrigerant 50 more volatile and improves heat transfer efficiency.

It is also preferred that the separator 56 extend above spray header 108 and that the refrigerant condensate trough 80 have a wall 118 that extends above condenser spray header 106 to avoid the over-spray of refrigerant 50 into the absorber and generator sections 26 and 30. Such an over-spray would reduce the efficiency of the absorption unit.

The refrigerant circulation assembly 24 of the embodiment illustrated in FIG. 2, which directs proportional flow of refrigerant 50 to the evaporator and condenser sections 22 and 32 according to load conditions, reduces the temperature of condenser fluid 36 leaving the condenser section 32 and increases the rate of condensation of refrigerant 50 vapor originating in the generator section 30. This embodiment increases the rate of response of the absorption unit to refrigeration load or load changes by increasing refrigerant 50 in the condenser section 32 without increasing the evaporation rate in the generator section 30 and increasing correspondingly the potential heat gain of the refrigerant 50. This embodiment also increases operating efficiency because the spraying of refrigerant 50 from the return tube 82 spray header 108 over the evaporator section 22 heat exchanger surfaces optimizes the refrigeration process during very light loads and the pumping of refrigerant through refrigerant spray header 60 provides high heat transfer efficiency during the high to light loads.

The solution valve 110, located on solution tube 68 after it leaves the solution heat exchanger 14, directs solution 62 discharged from the solution pump 64 to either the absorber spray header 114 or the generator spray header 116, or both. It is preferred that the solution valve 110 proportionately distribute the solution 62 to the absorber and generator spray headers 114 and 116 in accordance with the magnitude of the resultant signal. If the resultant signal provided represents that the absorption unit is experiencing full load demand, the entire flow of solution 62 is directed to the generator spray header 116. If the resultant signal provided represents that the absorption unit is experiencing no load demand, the entire flow of solution 62 is directed through the solution diverting conduit 112 to the absorber spray header 114.

With this embodiment, it is preferred that solution spray header 78 has pressure sensitive nozzles 120 which permit spray discharge according to the pressure build-up as concentrated solution 62b accumulates in the generator reservoir 70. Such nozzles 120, used in conjunction with solution valve 110, help maintain the proper solution 62 level and the proper degree of solution 62 concentration within the generator section 30 and also close off the spray of concentrated solution 62b when the absorption unit is experiencing no load demand. By utilizing solution valve 110 and pressure sensitive nozzles 120 on solution spray header 78, the absorption unit wastes less heat and the heat transfer efficiency improves. At no load demand, the entire flow of dilute solution 62a is diverted through solution diverting conduit 112 and is discharged through absorber spray header 114. Since there is no flow of dilute solution 62a directed to the generator section 30, the pressure on the pressure sensitive nozzles 120 drops and the nozzles 120 close. Thus, the solution 62 in the generator reservoir 70 remains concentrated; the pressure differential between the evaporator-absorber arrangement 10 and the generator-condenser arrangement 12 is maintained; and, the heat in the generator section 30 does not escape to the absorber section 26 to be carried away to the cooling tower 40 by the condenser fluid 36 after heat transfer. Heat transfer efficiency is improved and the absorpton unit is more responsive particularly as the unit is subjected to a load demand increasing from zero, because solution 62 from the generator section 30 is made immediately available to the absorber section 26 for heat transfer absorption at a higher temperature and a higher concentration than solution available in the prior art absorption units under similar conditions.

The solution circulation assembly 24 of the embodiment illustrated in FIG. 2, which directs proportional flow of solution 62 to the absorber and generator sections 26 and 30, increases operating efficiency at loads less than full load demand. The embodiment reduces the heat rejection to the cooling tower 40 by proportionately distributing the flow of dilute solution 62a between the absorber and generator sections 26 and 30 at partial load demands. Less heat is needed to vaporize the amount of refrigerant 50 supplied to the generator section 30, thus, the condenser fluid 36 carries less heat from the absorber and generator sections 26 and 30 to the cooling tower 40. The application of generator spray header 116 increases the rate of evaporation at partial loads by providing a proportional spray of dilute solution 62a to the generator section 3. The dilute solution 62a is more readily heated and vaporized because it arrives in lesser proportional amounts depenent upon load demand and as a spray, rather than as a full flow discharge into the generator reservoir 70.

The utilization of both the refrigerant and solution circulation assemblies 24 and 28 of this embodiment, as illustrated in FIG. 2, reduces the electrical, fuel, and mechanical energy operating costs of an absorption unit by increasing operating efficiency. When the resultant signal provided to the refrigerant and solution valves 102 and 110 represents that the absorption unit is experiencing full load demand, the refrigerant valve 102 directs the full flow of refrigerant 50 to the refrigerant spray header 60, and the solution valve 110 directs the full flow of solution 62 to the generator spray header 116. As the resultant signal changes indicating a decrease in load demand, the refrigerant valve 102 closes proportionately the flow to the refrigerant spray header 60 and opens proportionately the flow to the condenser spray header 106, and the solution valve 110 closes proportionately the flow to the generator spray header 116 and opens proportionately the flow to the absorber spray header 114. When the resultant signal provided represents that the absorption unit is experiencing no load demand, the refrigerant valve 102 directs the full flow of refrigerant 50 to the condenser spray header 106, and the solution valve 110 directs the full flow of solution 62 to the absorber spray header 114. As the resultant signal changes indicating an increase in load demand, the refrigerant valve 102 closes proportionately the flow to the condenser spray header 106 and opens proportionately the flow to the refrigerant spray header 60, and the solution valve 110 closes proportionately the flow to the absorber spray header 114 and opens proportionately the flow to the generator spray header 116.

Referring now to FIG. 3, another preferred embodiment of the present invention has a condenser fluid supply 16 with modified piping and a control assembly. This modified condenser fluid supply 16 is compatible with each of the embodiments described above and shown in FIGS. 1 and 2.

The condenser fluid supply 16 of this embodiment comprises the closed loop conduit 34, the condenser fluid pump 38, the cooling tower 40, and a control assembly 122. The control assembly 122 comprises a temperature sensitive probe 124, a temperature responsive controller 126, and a three-way diverting valve 128 connected to a three-way mixing valve 130 by a diversion conduit 132.

The temperature sensitive probe 124 is located on the closed loop conduit 34 between the condenser fluid pump 38 and the condenser fluid valve 96. This probe 124 monitors the temperature of the condenser fluid 36 before it passes through the condenser fluid valve 96 and into the evaporator-absorber arrangement 10. The prove 124 provides a signal of magnitude dependent upon the instantaneous temperature of the condenser fluid 36. This signal is received by the temperature responsive controller 126 which compares the signal to a set of predetermined design specifications and provides a governing signal which has a magnitude dependent upon the instantaneous relationship of the signal from the probe 124 and the design specifications. The governing signal provided by the temperature responsive controller 126 is received by the diverting valve 128 and the mixing valve 130. Each of the valves 128 and 130 respond according to the magnitude of the governing signal.

When the governing signal has a magnitude representing that the condenser fluid 36 is entering the absorber section 26 at a temperature below certain design specifications, the diverting valve 128 responds by proportionately opening a by-pass port 136 and proportionately closing a cooling tower port 138. At the same time, the mixing valve 130 responds to the governing signal by proportionately opening a by-pass inlet 140 and proportionately closing a cooling tower inlet 142. This permits a portion of the warmer condenser fluid 36 leaving the condenser section 32 to by-pass the cooling tower 40 through diversion conduit 132 and to mix with cooler condenser fluid 36 from the cooling tower 40, thereby raising the temperature of the condenser fluid 36 supplied to the condenser fluid pump 38.

When the governing signal has a magnitude representing that the condenser fluid 36 is entering the absorber section 26 at a temperature above design specifications, the diverting valve 128 responds by proportionately opening the cooling tower port 138 and proportionately closing the by-pass port 136. At the same time, the mixing valve 130 responds to the governing signal by proportionately opening the cooling tower inlet 142 and proportionately closing the by-pass inlet 140. In this manner, a lesser portion of warmer condenser fluid 36 leaving the condenser section 32 is permitted to by-pass the cooling tower 40 and mix with cooler condenser fluid 36 from the cooling tower 40. Thus, the temperature of the condenser fluid 36 entering the absorber section 26 is decreased.

It is also to be understood that mixing valve 130 can be omitted from the control assembly 122 if the absorption unit is on the same elevation or above the cooling tower 40, and that diverting valve 128 can be replaced by a two-way valve if the absorption unit is below the elevation of the cooling tower 40.

By utilizing the control assembly 122, the temperature of the condenser fluid 36 entering the absorber section 26 remains relatively constant under all conditions and load demands on the absorption unit.

Another embodiment of the present invention has a dilution valve and a control assembly. This dilution valve embodiment may be used in lieu of the embodiment utilizing valves to divert the condenser fluid 36 from the cooling toewr 40 or may be used in conjunction with the diverting valve embodiment.

The dilution valve embodiment comprises an automatic dilution valve 134 and a control assembly 122. The control assembly 122 is similar to that described with respect to the diverting valve embodiment. It comprises the temperature sensitive probe 124 and the temperature responsive controller 126. The probe 124 monitors the temperature of the condenser fluid before it enters the evaporator-absorber arrangement 10 and provides a signal of magnitude dependent upon the instantaneous temperature of the condenser fluid 36. This signal is received by the temperature responsive controller 126 which compares the signal to a preset design specification value and provides a regulating signal which has a magnitude dependent upon the instantaneous relationship of the signal from probe 124 and the design value. The regulating signal is received by the automatic dilution valve 134 which is located between the refrigerant circulation assembly 24 and the solution circulation assembly 28. The dilution valve 134 responds to the regulating signal by opening to permit direct dilution of the solution 62 by refrigerant 50 if the magnitude of the regulating signal represents that the condenser fluid 36 is entering the evaporator-absorber arrangement 10 at a temperature below the design specification for that absorption unit. This procedure prevents solution 62 crystallization in the absorption unit.

The dilution valve embodiment is preferred over the diverting valve embodiment for absorption units in which the condenser fluid 36 infrequently enters the evaporator-absorber arrangement 10 at a temperature below design specification.

When the dilution valve and diverting valve embodiments are used together, if the governing signal is such that all of the condenser fluid 36 by-passes the cooling tower 40, the temperature controller 126 provides a regulating signal which is received by the automatic dilution valve 134 which in turn opens permitting refrigerant 50 to pass directly into the solution circulation assembly 28; thereby, the dilute solution 62b is further diluted. This procedure prevents solution 62 crystallization since over-concentration or crystallization can occur whenever the condenser fluid 36 entering the absorber section 26 is sufficiently below specification.

While particular embodiments of the invention have been shown, it will be understood, of course, that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention.

What is claimed is:

1. An absorption refrigeration system responsive to variant load demands comprising:
   an evaporator for receiving and retaining refrigerant;
   chilled fluid supply means for providing chilled fluid to said evaporator and for directing said chilled fluid from said evaporator;
   vaporizing means providing said refrigerant in the proximity of said chilled fluid supply means for vaporization of a portion of said refrigerant within said evaporator;
   an absorber communicating with said evaporator for receiving and retaining solution for absorbing refrigerant vaporized within said evaporator, thereby diluting said solution;
   a generator coupled with said absorber for receiving and retaining said dilute solution from said absorber;
   heating means for providing a heat source for vaporizing said refrigerant contained within said dilute solution while said dilute solution is retained within said generator, thereby separating said refrigerant from said solution and making said solution more concentrated;
   a condenser communicating with said generator for condensing said refrigerant vaporized in said generator and for retaining refrigerant condensate separate from said solution;
   condenser fluid supply means for directing condenser fluid to said absorber and for directing said condenser fluid from said absorber to said condenser; said condenser fluid for absorbing heat radiated from said refrigerant during condensation;
   control means for adjusting the operation of said absorption refrigeration system to respond to variations in load demand upon said absorption refrigeration system, said control means comprising:
   a plurality of temperature sensitive means for monitoring temperature comprising:
      first temperature responsive means engaging said chilled fluid supply means for providing a first signal having magnitude dependent upon the temperature of said chilled fluid entering said evaporator; and,
      second temperature responsive means engaging said chilled fluid supply means for providing a second signal having magnitude dependent upon the temperature of said chilled fluid exiting said evaporator;
   comparison means connected to said first and second temperature responsive means for receiving said first and second signals, for comparing said first signal with said second signal, and for comparing said first and second signals with predetermined values, said comparison means providing a resultant signal having a magnitude dependent upon the instantaneous relationship of said first and second signals and said predetermined values; and,
   a plurality of valves coupled with said comparison means and responsive to said resultant signal comprising:
      a chilled fluid valve engaging said chilled fluid supply means for regulating the flow of chilled fluid entering said evaporator, said chilled fluid valve permits chilled fluid flow in an amount dependent upon the magnitude of said resultant signal;
      a condenser fluid valve engaging said condenser fluid supply means for regulating the flow of condenser fluid entering said absorber, said condenser fluid valve permits condenser fluid flow in an amount dependent upon the magnitude of said resultant signal; and,
      a heat source valve engaging said heating means for regulating the amount of heat entering said generator, said heat source valve permits passage of heat in an amount dependent upon the magnitude of said resultant signal.

2. A system as set forth in claim 1 further comprising a solution heat exchange for perheating said dilute solution after exiting said absorber and before entering said generator by passing said dilute solution through a reservoir for retaining concentrated solution, said reservoir coupled with said generator, the preheating being accomplished by heat transfer from said reservoir to said dilute solution.

3. A system as set forth in claim 1 further comprising:
   solution return means for conveying concentrated solution from said generator to said absorber and for maintaining predetermined operating pressures in said generator and said absorber; and,
   refrigerant return means for conveying said refrigerant condensate from said condenser to said evaporator and for maintaining predetermined operating pressures in said condenser and said evaporator.

4. A system as set forth in claim 1 wherein said comparison means comprises a differential controller for determining the differential between the temperature of said chilled fluid entering said evaporator and the temperature of said chilled fluid exiting said evaporator and for providing said resultant signal having a magnitude dependent upon the differential of chilled fluid temperatures entering and exiting said evaporator.

5. A system as set forth in claim 1 wherein said chilled fluid valve has an aperture that remains partially open when said chilled fluid valve is closed, to allow partial flow of said chilled fluid, thereby providing a continuous flow of chilled fluid for temperature monitoring.

6. A system as set forth in claim 1 wherein said heat source valve modulates and responds to changes in said resultant signal before said chilled fluid and condenser fluid valves.

7. A system as set forth in claim 1 wherein said heat source comprises steam and said heating means comprises discharge means for removing steam condensate from within said generator.

8. A system as set forth in claim 1 wherein said condenser fluid supply means comprises:
   a condenser fluid pump for circulating said condenser fluid within said condenser fluid supply means;
   a cooling tower for receiving and cooling said condenser fluid after exiting said condenser and before being pumped into said absorber by said condenser fluid pump;

condenser fluid by-pass means for directing condenser fluid exiting said condenser to said condenser fluid pump by-passing said cooling tower; and, condenser fluid control means for providing a governing signal to said condenser fluid by-pass means, said governing signal for regulating the proportion of said condenser fluid received by said cooling tower and the proportion of said condenser fluid by-passing said cooling tower.

9. A system as set forth in claim 8 wherein said condenser fluid supply means comprises:

temperature sensitive probe means engaging said condenser fluid exiting said condenser fluid by-pass means for determining the temperature of said condenser fluid and providing an initial signal having a magnitude dependent upon the temperature of said condenser fluid; and, governing means coupled with said probe means for receiving said initial signal and comparing said initial signal with a set of preset values and for providing said governing signal having a magnitude dependent upon the instantaneous relationship of said initial signal and said preset values.

10. A system as set forth in claim 8 wherein said condenser fluid by-pass means comprises a plurality of three-way by-pass valves responsive to said governing signal, comprising:

a first by-pass valve having an intake, a first output, and a second output, said intake for receiving said condenser fluid from said condenser, said first output for directing to said cooling tower an amount of said condenser fluid dependent upon the magnitude of said governing signal, said second output for directing to said condenser fluid pump by-passing said cooling tower an amount of said condenser fluid dependent upon the magnitude of said governing signal; and, a second by-pass valve having a first intake, a second intake and an output, said first intake for receiving said condenser fluid from said cooling tower, said second intake for receiving said condenser fluid from said second output of said first by-pass valve, said output for directing said condenser fluid from said first and second intakes to said absorber.

11. A system as set forth in claim 8 wherein said condenser fluid control means further provides a regulating signal having a magnitude dependent upon the instantaneous relationship of said initial signal and a predesignated value.

12. A system as set forth in claim 11 wherein said solution circulation means further comprises a solution pump with a suction intake and a pump output for circulating solution; said vaporizing means further comprises a refrigerant pump with a suction intake and a pump output; and said solution circulation and vaporizing means are adjacent a dilution valve connecting said suction intake of said solution pump to said pump output of said refrigerant pump, said dilution valve for receiving said regulating signal and for opening to permit dilution of said solution by said refrigerant in response to said regulating signal.

13. A system as set forth in claim 1 wherein said heat source comprises hot water.

14. A system as set forth in claim 1 wherein said solution comprises a lithium-bromide solution.

15. A system as set forth in claim 1 wherein said chilled fluid comprises water.

16. A system as set forth in claim 1 wherein said refrigerant comprises water.

17. A system as set forth in claim 1 wherein said first, second, and resultant signals are pneumatic signals.

18. A system as set forth in claim 1 wherein said first, second, and resultant signals are electrical signals.

19. A control system for an absorption refrigeration unit having an evaporator, an absorber, a generator, a condenser, a solution heat exchanger, a condenser fluid supply means for providing condenser fluid, a chilled fluid supply means for providing chilled fluid, and a heat supply means for providing heat, said control system for adjusting the operation of said absorption refrigeration unit to respond to variations in load demand, comprising:

a plurality of temperature sensitive means for monitoring temperature comprising:

first temperature responsive means engaging said chilled fluid supply means for providing a first signal having magnitude dependent upon the temperature of said chilled fluid entering said evaporator; and, second temperature responsive means engaging said chilled fluid supply means for providing a second signal having magnitude dependent upon the temperature of said chilled fluid exiting said evaporator;

comparison means connected to said first and second temperature responsive means for receiving said first and second signals, for comparing said first signal with said second signal, and for comparing said first and second signals with a set of predetermined values, said comparison means providing a resultant signal having a magnitude dependent upon the instantaneous relationship of said first and second signals and said predetermined values; and, a plurality of valves coupled with said comparison means and responsive to said resultant signal comprising:

a chilled fluid valve engaging said chilled fluid supply means for regulating the flow of chilled fluid entering said evaporator, said chilled fluid valve permits chilled fluid flow in an amount dependent upon the magnitude of said resultant signal;

a condenser fluid valve engaging said condenser fluid supply means for regulating the flow of condenser fluid entering said absorber, said condenser fluid valve permits condenser fluid flow in an amount dependent upon the magnitude of said resultant signal; and, a heat source valve engaging said heating means for regulating the amount of heat entering said generator, said heat source valve permits passage of heat in an amount dependent upon the magnitude of said resultant signal.

20. A system as set forth in claim 19 wherein said comparison means comprises a differential controller for determining the differential between the temperature of said chilled fluid entering said evaporator and the temperature of said chilled fluid exiting said evaporator and for providing said resultant signal having a magnitude dependent upon the differential of entering and exiting chilled fluid temperatures.

21. A system as set forth in claim 19 wherein said chilled fluid valve is limited to a minimum aperture during closure to allow partial flow of said chilled fluid, thereby providing a continuous flow of chilled fluid for temperature monitoring.

22. A system as set forth in claim 19 wherein said heat source valve responds to changes in said resultant signal before said chilled fluid and condenser fluid valves.

23. A system as set forth in claim 19 wherein said condenser fluid supply means comprises:
a condenser fluid pump for circulating said condenser fluid within said condenser fluid supply means;
a cooling tower for receiving and cooling said condenser fluid after exiting said condenser and before being pumped into said absorber by said condenser fluid pump;
condenser fluid by-pass means for directing condenser fluid exiting said condenser to said condenser fluid pump by-passing said cooling tower; and,
condenser fluid control means for providing a governing signal to said condenser fluid by-pass means, said governing signal for regulating the proportion of said condenser fluid received by said cooling tower and the proportion of said condenser fluid by-passing said cooling tower.

24. A system as set forth in claim 23 wherein said condenser fluid control means comprises:
heat sensitive probe means engaging said condenser fluid exiting said condenser fluid by-pass means before said condenser fluid enters said absorber for determining the temperature of said condenser fluid and providing an initial signal having a magnitude dependent upon the temperature of said condenser fluid; and,
governing means coupled with said probe means for receiving said initial signal and comparing said initial signal with a preset value and for providing said governing signal having a magnitude dependent upon the instantaneous relationship of said initial signal and said preset value.

25. A system as set forth in claim 23 wherein said condenser fluid by-pass means comprises a plurality of three-way by-pass valves responsive to said governing signal, comprising:
a first by-pass valve having an intake, a first output, and a second output, said intake for receiving said condenser fluid from said condenser, said first output for directing to said cooling tower an amount of said condenser fluid dependent upon the magnitude of said governing signal, said second output for directing to said condenser fluid pump by-passing said cooling tower an amount of said condenser fluid dependent upon the magnitude of said governing signal; and,
a second by-pass valve having a first intake, a second intake and an output, said first intake for receiving said condenser fluid from said cooling tower, said second intake for receiving said condenser fluid from said second output of said first by-pass valve, said output for directing said condenser fluid from said first and second intakes to said absorber.

26. A system as set forth in claim 23 wherein said condenser fluid control means further provides a regulating signal having a magnitude dependent upon the instantaneous relationship of said initial signal and a predesignated value.

27. A system as set forth in claim 26 wherein said solution circulation means further comprises a solution pump with a suction intake and a pump output for circulating solution; said vaporizing means further comprises a refrigerant pump with a suction intake and a pump output; and said solution circulation and vaporizing means are adjacent a dilution valve connecting said suction intake of said solution pump to said pump output of said refrigerant pump, said dilution valve for receiving said regulating signal and for opening to permit dilution of said solution by said refrigerant in response to said regulating signal.

28. A system as set forth in claim 19 wherein said first, second, and resultant signals are pneumatic signals.

29. A system as set forth in claim 19 wherein said first, second, and resultant signals are electrical signals.

30. An absorption refrigeration system responsive to variant load demands comprising:
an evaporator for receiving and retaining refrigerant;
chilled fluid supply means for providing chilled fluid to said evaporator and for directing said chilled fluid from said evaporator;
vaporizing means for providing said refrigerant in the proximity of said chilled fluid supply means for vaporization of a portion of said refrigerant within said evaporator;
an absorber communicating with said evaporator for receiving and retaining solution for absorbing refrigerant vaporized within said evaporator, thereby diluting said solution;
a generator coupled with said absorber for receiving and retaining said dilute solution from said absorber;
heating means for providing a heat source for vaporizing said refrigerant contained within said dilute solution while said dilute solution is retained within said generator, thereby separating said refrigerant from said solution and making said solution more concentrated;
a condenser communicating with said generator for condensing said refrigerant vaporized in said generator and for retaining refrigerant condensate separate from said solution;
condenser fluid supply means for providing condenser fluid to said absorber and for directing said condenser fluid from said absorber to said condenser; said condenser fluid for absorbing heat radiated from said refrigerant during condensation;
solution circulation means for providing said solution in said absorber and said generator, said circulation means comprises a heat exchanger means for preheating said dilute solution after exiting said absorber and before entering said generator by passing said dilute solution through a reservoir for retaining concentrated solution coupled with said generator;
control means for adjusting the operation of said absorption refrigeration system to respond to variations in load demand upon said absorption refrigeration system, said control means comprising:
a plurality of heat sensitive means for monitoring temperature comprising:
first heat responsive means engaging said chilled fluid supply means for providing a first signal having magnitude dependent on the temperature of said chilled fluid entering said evaporator; and,
second heat responsive means engaging said chilled fluid supply means for providing a second signal having magnitude dependent on the temperature of said chilled fluid exiting said evaporator;

comparison means connected to said plurality of heat sensitive means for receiving said first and second signals, for comparing said first and second signals to predetermined values, said comparison means providing a resultant signal having a magnitude dependent upon the instantaneous relationship of said first and second signals and said predetermined values; and, a plurality of valves coupled with said comparison means and responsive to said resultant signal comprising:

a chilled fluid valve engaging said chilled fluid supply means for regulating the flow of chilled fluid entering said evaporator, said chilled fluid valve permits chilled fluid flow in an amount dependent upon the magnitude of said resultant signal;

a condenser fluid valve engaging said condenser fluid supply means for regulating the flow of condenser fluid entering said absorber, said condenser fluid valve permits condenser fluid flow in an amount dependent upon the magnitude of said resultant signal;

a heat source valve engaging said heating means for regulating the amount of heat entering said generator, said heat source valve permits passage of heat in an amount dependent upon the magnitude of said resultant signal;

a refrigerant valve engaging said vaporizing means for regulating the flow of refrigerant to said evaporator and said condenser; said refrigerant valve proportions the refrigerant flow according to the magnitude of said resultant signal; and, a solution valve engaging said solution circulation means for regulating the flow of solution between said absorber and said generator; said solution valve proportions the solution flow according to the magnitude of said resultant signal.

31. A system as set forth in claim 30 wherein said solution valve engages said solution circulation means between said heat exchanger and said generator.

32. A system as set forth in claim 30 wherein said solution valve is at least a three-way valve comprising an intake, a first output and a second output, said first output for conveying solution to said generator, said second output for conveying solution to said absorber by-passing said generator.

33. A system as set forth in claim 32 wherein said solution circulation means further comprises a plurality of spray means comprising:

generator spray means for providing said dilute solution to said generator from said first output of said solution valve;

solution spray means for providing said concentrated solution to said absorber from said reservoir of said heat exchanger; and, absorber spray means for providing said dilute solution to said absorber from said second output of said solution valve, thereby permitting said solution to by-pass said generator.

34. A system as set forth in claim 33 wherein said generator spray means comprises at least one generator spray nozzle.

35. A system as set forth in claim 33 wherein said solution spray means comprises at least one pressure sensitive solution spray nozzle for releasing a spray of said concentrated solution into said absorber, the amount of the spray being dependent upon the pressure within said solution circulation means at said solution spray nozzle.

36. A system as set forth in claim 33 wherein said absorber spray means comprises at least one absorber spray nozzle for releasing a spray of said dilute solution into said absorber.

37. A system as set forth in claim 36 wherein said refrigerant valve is at least a three-way valve comprising an input, a condenser output, and an evaporator output, said condenser output for conveying refrigerant to said condenser, said evaporator output for conveying refrigerant to said evaporator by-passing said condenser.

38. A system as set forth in claim 37 wherein said vaporizing means comprises a plurality of spray means comprising:

condenser spray means for providing said refrigerant to said condenser from said condenser output;

evaporator spray means for providing said refrigerant to said evaporator from said evaporator output; and, condensate spray means for providing to said evaporator said refrigerant condensed in said condenser and said refrigerant to said condenser via said condenser spray means.

39. A system as set forth in claim 38 wherein said condenser spray means comprises at least one condenser spray nozzle for releasing a spray of said refrigerant into said condenser.

40. A system as set forth in claim 38 wherein said evaporator spray means comprises at least one evaporator spray nozzle for releasing a spray of said refrigerant into said evaporator.

41. A system as set forth in claim 38 wherein said condensate spray means comprises at least one condensate spray nozzle for releasing a spray of said refrigerant from said condenser into said evaporator.

42. A system as set forth in claim 40 wherein said condenser fluid supply means comprises:

a condenser fluid pump for circulating said condenser fluid within said condenser fluid supply means;

a cooling tower for receiving and cooling said condenser fluid after exiting said condenser and before being pumped into said absorber by said condenser fluid pump;

condenser fluid by-pass means for directing condenser fluid exiting said condenser to said condenser fluid pump by-passing said cooling tower; and, condenser fluid control means for providing a governing signal to said condenser fluid by-pass means, said governing signal for regulating the proportion of said condenser fluid received by said cooling tower and the proportion of said condenser fluid by-passing said cooling tower.

43. A system as set forth in claim 42 wherein said condenser fluid control means comprises:

heat sensitive probe means engaging said condenser fluid exiting said condenser fluid by-pass means before said condenser fluid enters said absorber for determining the temperature of said condenser fluid and providing an initial signal having a magnitude dependent upon the temperature of said condenser fluid; and, governing means coupled with said probe means for receiving said initial signal and comparing said initial signal with a set of preset values and for providing said governing signal having a magnitude dependent upon the instantaneous relationship of said initial signal and said preset values.

44. A system as set forth in claim 42 wherein said condenser fluid by-pass means comprises a plurality of three-way by-pass valves responsive to said governing signal, comprising:
a first by-pass valve having an intake, a first output, and a second output, said intake for receiving said condenser fluid from said condenser, said first output for directing to said cooling tower an amount of said condenser fluid dependent upon the magnitude of said governing signal, said second output for directing to said condenser fluid pump by-passing said cooling tower an amount of said condenser fluid dependent upon the magnitude of said governing signal; and,
a second by-pass valve having a first intake, a second intake and an output, said first intake for receiving said condenser fluid from said cooling tower, said second intake for receiving said condenser fluid from said second output of said first by-pass valve, said output for directing said condenser fluid from said first and second intakes to said absorber.

45. A system as set forth in claim 42 wherein said condenser fluid control means further provides a regulating signal having a magnitude dependent upon the instantaneous relationship of said initial signal and a predesignated value.

46. A system as set forth in claim 45 wherein said solution circulation means further comprises a solution pump with a suction intake and a pump output for circulating solution; said vaporizing means further comprises a refrigerant pump with a suction intake and a pump output; and said solution circulation and vaporizing means are adjacent a dilution valve connecting said suction intake of said solution pump to said pump output of said refrigerant pump, said dilution valve for receiving said regulating signal and for opening to permit dilution of said solution by said refrigerant in response to said regulating signal.

* * * * *

UNITED STATES PATENT AND TRADEMARK OFFICE
CERTIFICATE OF CORRECTION

PATENT NO. : 4,269,034
DATED : MAY 26, 1981
INVENTOR(S) : JOSEPH A. RZECHULA

It is certified that error appears in the above-identified patent and that said Letters Patent are hereby corrected as shown below:

Column 4, line 54, change "cooleld" to --cooled--.

Column 8, line 24, change "sense" to --senses--.

Column 8, line 42, change "are" to --an--.

Column 11, line 10, delete "in operation".

Column 11, line 18, change "in" to --In--.

Column 11, line 60, change "limite-stop" to --limit-stop--.

Column 12, line 46, insert after "refrigerant" the word --diverting--.

Column 14, line 48, change "3" to --30--.

Column 14, line 50, change "depenent" to --dependent--.

Column 15, line 37, change "prove" to --probe--.

UNITED STATES PATENT AND TRADEMARK OFFICE
CERTIFICATE OF CORRECTION

PATENT NO. : 4,269,034
DATED : MAY 26, 1981
INVENTOR(S) : JOSEPH A. RZECHULA

It is certified that error appears in the above-identified patent and that said Letters Patent are hereby corrected as shown below:

Column 16, line 26, change "toewr" to --tower--.

Column 17, line 40, change "directing" to --providing--.

Claim 2, Column 18, line 24, change "exchange" to --exchanger--.

Claim 2, Column 18, line 24, change "perheating" to --preheating--.

Claim 9, Column 19, line 12, change "supply" to --control--.

Signed and Sealed this

Twenty-second Day of December 1981

[SEAL]

*Attest:*

GERALD J. MOSSINGHOFF

*Attesting Officer*  *Commissioner of Patents and Trademarks*